United States Patent
Choi et al.

(10) Patent No.: US 10,404,513 B2
(45) Date of Patent: *Sep. 3, 2019

(54) METHOD AND DEVICE FOR TRANSMITTING DATA UNIT

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR); Dongguk Lim, Seoul (KR); Jinyoung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,539

(22) Filed: Dec. 13, 2017

(65) Prior Publication Data

US 2018/0115451 A1 Apr. 26, 2018

Related U.S. Application Data

(63) Continuation of application No. 14/785,834, filed as application No. PCT/KR2014/004049 on May 7, 2014, now Pat. No. 9,872,683.

(Continued)

(51) Int. Cl.
*H04J 3/06* (2006.01)
*H04L 27/26* (2006.01)
*H04L 5/00* (2006.01)

(52) U.S. Cl.
CPC ........ *H04L 27/2633* (2013.01); *H04L 5/0007* (2013.01); *H04L 27/2602* (2013.01); *H04L 27/2613* (2013.01); *H04L 27/2666* (2013.01)

(58) Field of Classification Search
None
See application file for complete search history.

(56) References Cited

U.S. PATENT DOCUMENTS 7,558,328 B2 7/2009 Mujtaba
7,711,061 B2 5/2010 Trachewsky
(Continued)

FOREIGN PATENT DOCUMENTS

JP 2008505583 A 2/2008
JP 2010068066 3/2010
(Continued)

OTHER PUBLICATIONS

Australian Patent Office Application No. 2014263335, Office Action dated Nov. 4, 2016, 7 pages.

(Continued)

*Primary Examiner* — Sithu Ko
(74) *Attorney, Agent, or Firm* — Lee, Hong, Degerman, Kang & Walmey

(57) ABSTRACT

A method and a device for transmitting a data unit are disclosed. A method for transmitting a PPDU can comprise the steps of: generating, by an STA, the PPDU including a first portion and a second portion; and transmitting, by the STA, the PPDU, wherein the first portion is generated by performing IFFT according to a first FFT size, the second portion is generated by performing IFFT according to a second FFT size, and the first FFT size can differ from the second FFT size.

10 Claims, 15 Drawing Sheets

Related U.S. Application Data

(60) Provisional application No. 61/820,185, filed on May 7, 2013.

(56) References Cited

U.S. PATENT DOCUMENTS

| | | |
|---|---|---|
| 2004/0081131 A1 | 4/2004 | Walton et al. |
| 2006/0062317 A1 | 3/2006 | Chang et al. |
| 2006/0274820 A1 | 12/2006 | Walton et al. |
| 2007/0047666 A1* | 3/2007 | Trachewsky .......... H04L 1/0006 375/267 |
| 2009/0122771 A1 | 5/2009 | Cai |
| 2010/0061493 A1 | 3/2010 | Takahashi et al. |
| 2011/0032875 A1* | 2/2011 | Erceg .................. H04B 7/0452 370/328 |
| 2012/0002756 A1* | 1/2012 | Zhang .................. H04L 5/0048 375/308 |
| 2012/0195391 A1 | 8/2012 | Zhang et al. |
| 2013/0034091 A1 | 2/2013 | Kim et al. |
| 2013/0107912 A1 | 5/2013 | Ponnampalam |
| 2016/0072654 A1 | 3/2016 | Choi et al. |
| 2016/0337153 A1 | 11/2016 | Seok |

FOREIGN PATENT DOCUMENTS

| | | |
|---|---|---|
| JP | 2011-035790 | 2/2011 |
| JP | 2011-217210 | 10/2011 |
| KR | 1020070023496 A | 2/2007 |
| KR | 10-1165629 | 7/2012 |
| KR | 10-2012-0095434 | 8/2012 |
| WO | 2013074917 A1 | 5/2013 |
| WO | 2015081132 | 6/2015 |
| WO | 2015102181 | 7/2015 |
| WO | 2015105875 | 7/2015 |

OTHER PUBLICATIONS

European Patent Office Application Serial No. 14794287.4, Search Report dated Jan. 16, 2017, 8 pages.

Chun et al., "Legacy Support on HEW frame structure," IEEE 11-13/1057r0, Sep. 2013, 8 pages.

Lee et al., "HEW SG PHY Considerations for Outdoor Environment," IEEE 11-13/0536r0, May 2013, 21 pages.

PCT International Application No. PCT/KR2014/004049, Written Opinion of the International Searching Authority dated Jul. 29, 2014, 1 page.

IP Australia Application Serial No. 2014263335, Office Action dated May 12, 2017, 5 pages.

European Patent Office Application Serial No. 14794287.4, Office Action dated Sep. 17, 2018, 5 pages.

\* cited by examiner (A)

(B)

METHOD AND DEVICE FOR TRANSMITTING DATA UNIT

CROSS-REFERENCE TO RELATED APPLICATIONS

This application is a continuation of U.S. patent application Ser. No. 14/785,834, filed on Oct. 20, 2015, now U.S. Pat. No. 9,871,683, which is the National Stage filing under 35 U.S.C. 371 of International Application No. PCT/KR2014/004049, filed on May 7, 2014, which claims the benefit of U.S. Provisional Application No. 61/820,185, filed on May 7, 2013, the contents of which are all incorporated by reference herein in their entirety.

FIELD OF THE INVENTION

The present invention relates to wireless communications, and more particularly, to a method and a device for transmitting a data unit.

RELATED ART

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEW means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

An aspect of the present invention is to provide a method for transmitting a physical layer convergence procedure (PLCP) protocol data unit (PPDU).

Another aspect of the present invention is to provide a device for transmitting a PPDU.

To achieve the foregoing aspects of the present invention, a method for transmitting a physical layer convergence procedure (PLCP) protocol data unit (PPDU) according to one embodiment of the present invention includes generating, by a station (STA), the PPDU including a first portion and a second portion; and transmitting, by the STA, the PPDU, wherein the first portion is generated by performing an inverse fast Fourier transform (IFFT) based on a first fast Fourier transform (FFT) size, the second portion is generated by performing an IFFT based on a second FFT size, and the first FFT size is different from the second FFT.

To achieve the foregoing aspects of the present invention, an STA transmitting a PPDU in a wireless local area network (WLAN) according to another embodiment of the present invention includes a radio frequency (RF) unit configured to transmit a radio signal and a processor selectively connected to the RF unit, wherein the processor is configured to generate the PPDU including a first portion and a second portion and to transmit the PPDU, the first portion being generated by performing an IFFT based on a first FFT size, the second portion being generated by performing an IFFT based on a second FFT size, and the first FFT size being different from the second FFT.

Using a new-format physical layer convergence procedure (PLCP) protocol data unit (PPDU) may minimize PLCP preamble overhead and provide backward compatibility for a legacy station (STA). Further, an STA supporting a new-format PPDU may quickly determine whether a received PPDU is a new-format PPDU.

DESCRIPTION OF EXEMPLARY EMBODIMENTS

Figure 1:
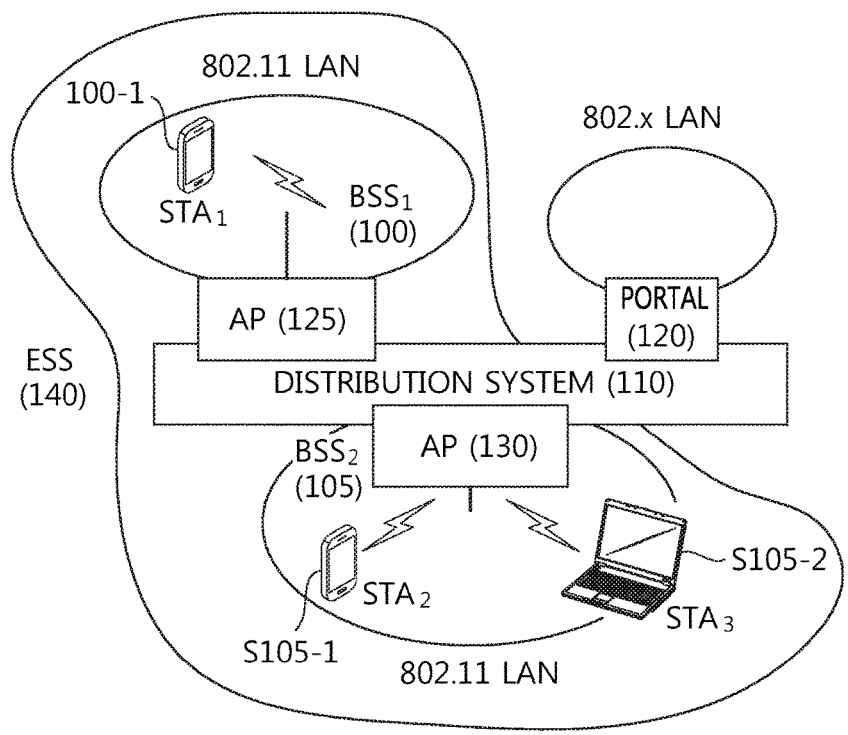
FIG. 1 is a concept view illustrating the structure of a wireless local area network (WLAN).
Figure 1:
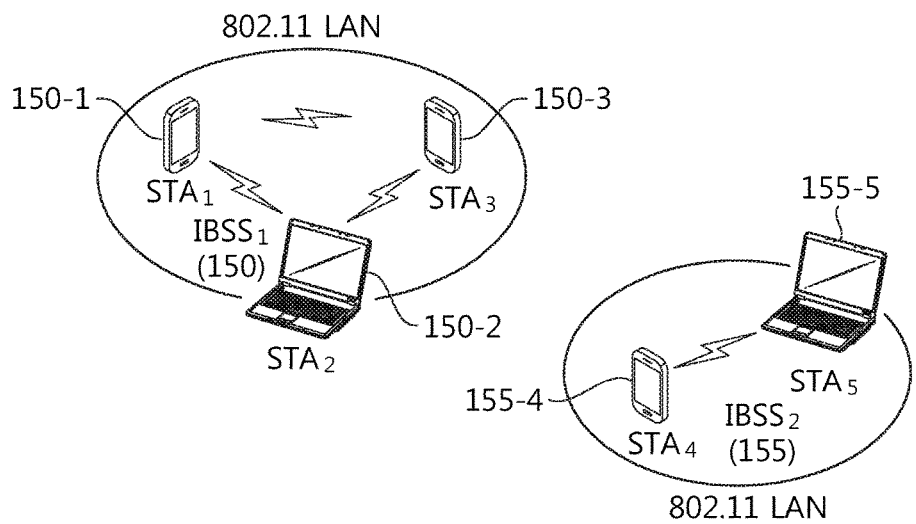

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
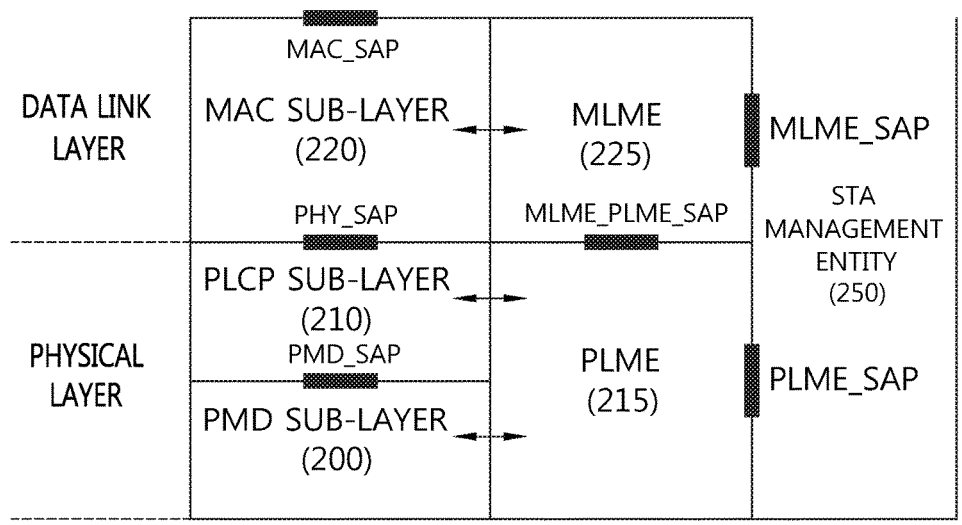
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
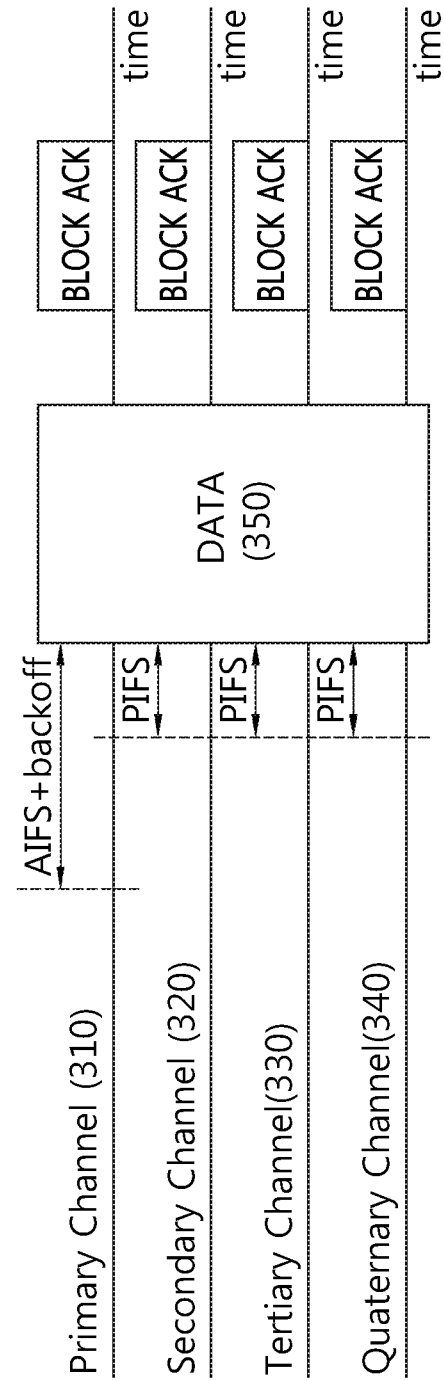
FIG. 3 is a schematic view illustrating a broadband media access control technique in a wireless local area network (WLAN).

FIG. 3 is a schematic view illustrating a broadband media access control technique in a wireless local area network (WLAN).

WLAN standards preceding IEEE 802.11n support a 20 MHz channel bandwidth only. IEEE 802.11n starts to support a 40 MHz channel bandwidth, and IEEE 802.11ac additionally supports 80 MHz and 160 MHz channel bandwidths.

FIG. 3 illustrates channel access in an 80 MHz channel bandwidth supported by IEEE 802.11ac.

To coexist with existing IEEE 802.11b/g/n, IEEE 802.11ac can define a 20 MHz channel for channel access based on distributed coordination function (DCF) and enhanced distributed channel access (EDCA) protocols. The 20 MHz channel for channel access based on DCF and EDCA protocols may be referred to as a primary channel.

An STA may sense states of other channels than the primary channel 310 in order to transmit a frame through a 40 MHz channel bandwidth or 80 MHz channel bandwidth. The STA may sense the states of the channels (secondary channel 320, tertiary channel 330 and quaternary channel 340) other than the primary channel 310 for a certain period of time (for example, PCF inter frame space (PIFS)) and determine a channel bandwidth for transmitting data 350.

As a result, when all four 20 MHz channel bandwidths 310, 320, 330 and 340 are available, the STA may transmit the data 350 through an 80 MHz bandwidths and receive a block acknowledgement (BA) through each 20 MHz channel.

In IEEE 802.11ac, since an available channel bandwidth varies from 20 MHz to 160 MHz, it is important to determine an appropriate channel bandwidth between a transmitting STA and a receiving STA in determining performance of a WLAN. IEEE 802.11ac may implement a dynamic channel bandwidth setting protocol based on a request to send (RTS) frame/clear to send (CTS) frame. According to the dynamic channel bandwidth setting protocol, a transmitting STA may transmit an RTS frame through a broadband, and a receiving STA may transmit a CTS frame through a currently available channel bandwidth. Specifically, a transmitting STA desiring to use a 160 MHz channel bandwidth may transmit an RTS frame to a receiving STA through a 160 MHz channel bandwidth. When an 80 MHz channel bandwidth is currently available, the receiving STA may transmit a CTS frame to the transmitting STA through the 80 MHz channel bandwidth.

When the transmitting STA receives the CTS frame through the 80 MHz channel bandwidth, the transmitting STA may transmit data to the receiving STA through a channel bandwidth smaller than the 80 MHz channel bandwidth used for receiving the CTS frame.

Figure 4:
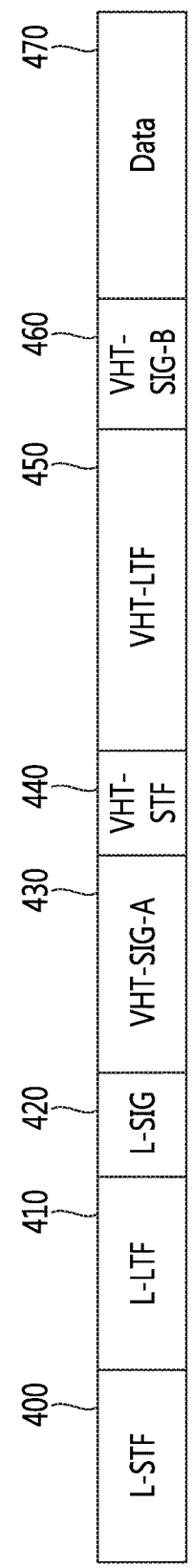
FIG. 4 is a schematic view illustrating a very high throughput (VHT) PPDU format in a WLAN.

FIG. 4 is a schematic view illustrating a very high throughput (VHT) PPDU format in a WLAN.

FIG. 4 discloses a VHT PPDU defined in IEEE 802.11ac.

For compatibility with a legacy STA, the VHT PPDU may include a legacy-short training field (L-STF) 400, a legacy-long training field (L-LTF) 410, and a legacy signal field (L-SIG) 420.

The L-STF 400 may include an L-STF sequence. The L-STF sequence may be used for frame detection, automatic gain control (AGC), diversity detection and coarse frequency/time synchronization.

The L-LTF 410 may include an L-LTF sequence. The L-LTF sequence may be used for fine frequency/time synchronization and channel prediction.

The L-SIG 420 may include control information. Specifically, the L-SIG 420 may include information on data rate and data length.

A VHT-SIG-A 430 may include information for interpreting the VHT PPDU. The VHT-SIG-A 430 may include a VHT-SIG-A1 and a VHT-SIG-A2. The VHT-SIG-A1 may include bandwidth information on a used channel, whether space-time block coding is applied, a group identifier (ID) indicating grouped STAs for multi-user (MU)-multiple-input and multiple-output (MIMO) and information on the number of space-time streams used for implementing MU-MIMO. The bandwidth information on the channel included in the VHT-SIG-A1 may include information on a bandwidth used for transmitting a field followed by the VHT-SIG-A1.

The VHT-SIG-A2 may include information on whether a short guard interval (GI) is used, forward error correction (FEC) information, information on a modulation and coding scheme (MCS) for a single user, information on channel coding types for multiple users, beamforming related information, redundancy bits for cyclic redundancy checking (CRC) and tail bits of a convolutional decoder.

A VHT-STF 440 may be used to improve automatic gain control (AGC) estimation in an MIMO environment.

A VHT-LTF 450 is used for channel estimation in an MIMO environment.

A VHT-SIG-B 460 may include information on each STA, that is, information on PSDU length and a MCS, tail bits or the like.

A Data 470 is a payload, which may include a SERVICE field, a scrambled PLCP service data unit (PSDU), tail bits and padding bits.

Figure 5:
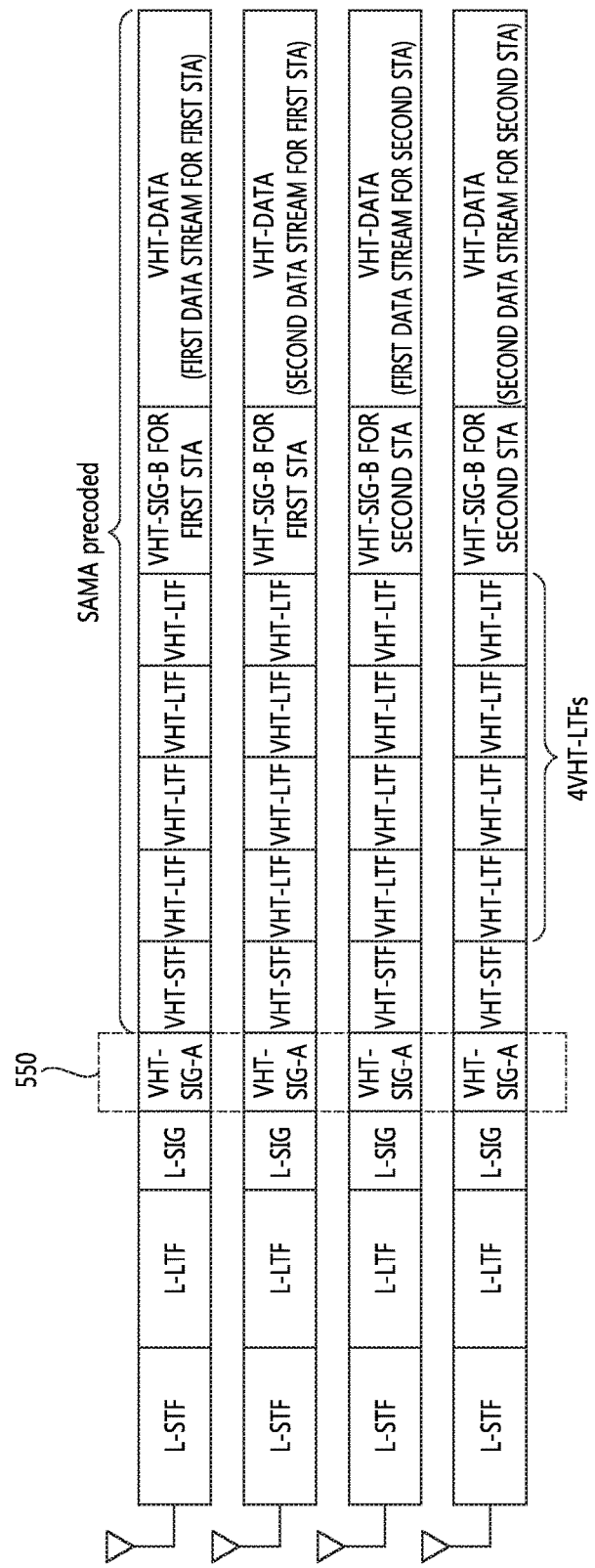
FIG. 5 is a schematic view illustrating a PPDU transmitted through a channel.

FIG. 5 is a schematic view illustrating a PPDU transmitted through a channel.

FIG. 5 discloses a PPDU format for MU-MIMO.

FIG. 5 discloses space-time streams transmitted by an AP in MU-MIMO-based communications between the AP and two STAs (first STA and second STA).

Among four space-time streams 510, 520, 530 and 540, two space-time streams 510 and 520 may be allocated to transmit data to a first STA, and the remaining two space-time streams 530 and 540 may be allocated to transmit data to a second STA. Each space-time stream may be transmitted through a 20 MHz channel bandwidth. The respective space-time streams may be referred to as a first space-time stream 510 to a fourth space-time stream 540, and channels for transmitting the first space-time stream 510 to the fourth space-time stream 540 may be referred to as a first channel to a fourth channel.

Referring to FIG. 5, among fields transmitted respectively through the first space-time stream 510 to the fourth space-time stream 540, an L-STF, L-LTF, L-SIG and VHT-SIG-A may be duplicated. That is, the L-STF, L-LTF, L-SIG and VHT-SIG-A transmitted respectively through a plurality of 20 MHz channel bandwidths may be duplicated fields.

A field followed by the VHT-SIG-A 550 in each space-time stream transmitted through 20 MHz may include different information depending on a space-time stream. Enhanced features, such as MIMO, MU-MIMO and transmission through an extended channel bandwidth, may be applied to the field followed by the VHT-SIG-A 550.

The VHT-SIG-A 550 may include information on a bandwidth for a transmitting STA to transmit data and information on the number of space-time streams allocated to respective receiving STAs. A receiving STA may determine a channel bandwidth for receiving data transmitted after the VHT-SIG-A 550 based on the information on the bandwidth transmitted through the VHT-SIG-A 550. When the information on the bandwidth is not transmitted through the VHT-SIG-A 550, the receiving STA performs blind detection for a bandwidth available for transmission to retrieve a bandwidth for transmitting data.

Further, in MU-MIMO, the receiving STA may determine a data stream to receive based on space-time stream allocation information included in the VHT-SIG-A 550.

In detail, the VHT-SIG-A 550 may include the bandwidth information, which indicates 80 MHz for transmitting data, and the information on the number of the space-time streams allocated to the respective receiving STAs, which indicates that the first STA is allocated the two space-time streams 510 and 520 and the second STA is allocated the two space-time streams 530 and 540.

The first STA and the second STA may receive data from the transmitting STA based on the information included in the VHT-SIG-A 550.

Next, one embodiment of the present invention discloses a PPDU format for a next-generation WLAN after IEEE802.11ac to satisfy a demand for high throughput and quality of experience (QoE) performance improvement.

Hereinafter, for convenience of description, a next-generation WLAN may be referred to as a high efficiency WLAN (HEW), a frame supporting the HEW as an HEW frame, a PPDU supporting the HEW as an HEW PPDU, and an STA supporting the HEW as an HEW STA.

In addition, a PPDU other than an HEW PPDU, such as a non-HT PPDU, HT PPDU or VHT PPDU, may be referred to as a legacy PPDU, a frame transmitted and received through a legacy PPDU as a legacy frame, and an STA supporting only a legacy PPDU as a legacy STA. These terms are arbitrary terms which may be replaced with a variety of different terms.

When an HEW PPDU is used in the HEW, the HEW PPDU may be used to transmit and receive data in an environment where the HEW PPDU coexists with a legacy PPDU for legacy STAs supporting an existing WLAN system. In this environment, the legacy STAs may have no backward compatibility with the HEW. Thus, the HEW PPDU needs to be defined so as not to affect the legacy STAs. That is, the HEW PPDU needs to minimize overhead of a PCLP preamble and simultaneously support legacy STAs.

For convenience, the HEW PPDU may be divided into a legacy part to an L-SIG and an HEW part followed by the L-SIG. For example, the HEW part may include at least one of fields for supporting the HEW, such as HEW-SIG-A, HEW-STF, HEW-LTF and HEW-SIG-B. These fields for supporting the HEW are illustrative fields for interpreting the HEW PPDU excluding the legacy part. Specifically, an HEW-SIG-A, HEW-SIG-B and HEW-SIG-A/B are illustrative signaling fields including information for decoding the HEW part, and an HEW-STF and HEW-LTF(s) are illustrative training fields used for AGC and/or channel prediction and channel/frequency tracking in the HEW part.

Figure 6:
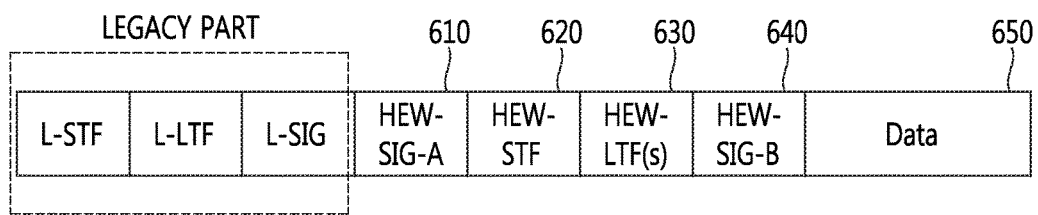
FIG. 6 is a schematic view illustrating an HEW PPDU according to one embodiment of the present invention.

FIG. 6 is a schematic view illustrating an HEW PPDU according to one embodiment of the present invention.

Referring to FIG. 6, an HEW part of the HEW PPDU may sequentially include an HEW-SIG-A 610, an HEW-STF 620, an HEW-LTF(s) 630 and an HEW-SIG-B 640. For convenience of description, a Data field is assumed to be included in the HEW part.

The HEW-SIG-A 610 is a first signaling field of the HEW part. The HEW-SIG-A 610 may include channel bandwidth information. The channel bandwidth information may indicate the size of a channel bandwidth used for transmitting fields included in the HEW part followed by the HEW-SIG-A 610 (for example, HEW-STF 620, HEW-LTF(s) 630, HEW-SIG-B 640 and Data field 650). A receiving STA which receives the HEW PPDU may receive data included in a field transmitted after the HEW-SIG-A 610 through a channel bandwidth indicated by the channel bandwidth information. When the receiving STA does not recognize the channel bandwidth information, the receiving STA needs to detect the size of a channel bandwidth for the HEW part after the HEW-SIG-A 610 based on blind detection. Further, the HEW-SIG-A 610 may include additional information for decoding the HEW PPDU.

The HEW-STF 620 may be used for AGC of data transmitted after the HEW-STF 620 in the HEW PPDU.

The HEW-LTF(s) 630 may be used for channel prediction for decoding the HEW-SIG-B 640 and/or Data field 650. The number of HEW-LTFs 630 may be determined based on the number of space-time streams.

The HEW-SIG-B 640 may be used to provide necessary information for supporting downlink (DL)/uplink (UL) MU-MIMO or to transmit additional information for supporting the HEW.

The HEW-SIG-A, HEW-SIG-B or HEW-SIG-A/B may include the following pieces of information for supporting the HEW. The HEW-SIG-A, HEW-SIG-B or HEW-SIG-A/B may be referred to as an HEW signaling field.

The HEW is capable of supporting OFDMA in a multiple access mode, and the HEW signaling fields may include information for supporting multiple access. For example, the HEW signaling fields may include information on a frequency band (or channel) allocated to each of a plurality of STAs. Identifier (ID) information, such as group identifier (GID) of each STA, may be used to indicate a frequency band allocated to each of the STAs, and the HEW signaling fields may indicate information on a used frequency band for an STA based on the GID of the STA.

In addition, the HEW may support UL-MIMO, and the HEW signaling fields may include information on whether UL-MIMO is allowed, information on the number of space-time streams used in UL-MIMO, and information on a channel used for UL-MIMO.

Alternatively, the HEW allows an AP and a plurality of STAs to simultaneously perform communications and allows the AP to transmit information on STAs to simultaneously transmit and receive data. The HEW signaling fields may include information on the number of STAs acquiring the same transmission opportunity (TXOP) or a list of STAs acquiring the same TXOP. Also, the HEW signaling fields may transmit information on the duration of the TXOP.

Figure 7:
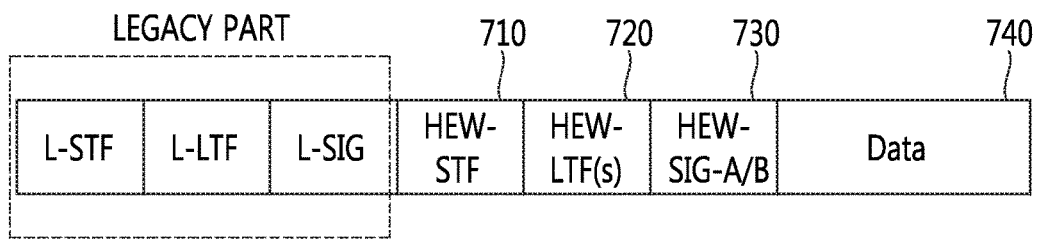
FIG. 7 is a schematic view illustrating an HEW PPDU according to one embodiment of the present invention.

FIG. 7 is a schematic view illustrating an HEW PPDU according to one embodiment of the present invention.

Referring to FIG. 7, an HEW part of the HEW PPDU may sequentially include an HEW-STF 710, an HEW-LTF(s) 720 and an HEW-SIG-A/B 730.

In the HEW PPDU, the HEW-STF 710 may precede a signaling field (for example, HEW-SIG-A/B 730). As described above, when there is no channel bandwidth information for the HEW part transmitted through the signaling field, a receiving STA needs to detect the size of a channel bandwidth for the HEW part based on blind detection. Thus, in the HEW PPDU according to the embodiment of the present invention, to avoid blind detection, a sequence constituting the HEW-STF 710 (HEW-STF sequence) may include the channel bandwidth information for the HEW part. The HEW-STF sequence may be allocated to a plurality of subcarriers on an OFDM symbol (HEW-STF OFDM symbol) transmitting the HEW-STF 710.

Different HEW-STF sequences may indicate the sizes of different channel bandwidths for the HEW part. That is, a particular HEW-STF sequence may indicate the size of a particular channel bandwidth allocated to the HEW part.

According to another embodiment of the present invention, when the channel bandwidth for the HEW part is determined on a channel bandwidth indicated in a legacy part, the HEW-STF sequence may include no channel bandwidth information.

According to still another embodiment of the present invention, the HEW-STF sequence may include not only channel bandwidth information but information on a guard interval (GI) or cyclic prefix (CP) of an OFDM symbol used for transmitting the HEW part. Hereinafter, in the embodiment of the present invention, the GI and the CP may be interpreted as having the same meaning and the term "GI" is used for convenience of description.

In the HEW, various lengths of GIs (long GI, double GI and triple GI) may be used depending on wireless communication environments. The HEW-STF sequence may include the information on the GI of the OFDM symbol used for transmitting the HEW part.

In the HEW, the length of a GI for the HEW PPDU may vary depending on communication environments, and the HEW-STF sequence may include information on the length of a used GI. In the HEW, an HEW PPDU optimized according to the length of a GI may be used. That is, the HEW PPDU may be configurable depending on the length of the GI.

The HEW-STF sequence may independently transmit the channel bandwidth information and the GI information but transmit information on a combination of the channel bandwidth information and the GI information. For example, a first HEW-STF sequence may indicate a first channel bandwidth size and a first GI length, and a second HEW-STF sequence may indicate a first channel bandwidth size and a second GI length.

Alternatively, the receiving STA may roughly determine size information on a fast Fourier transform (FFT) based on a signal waveform of the HEW-STF sequence to estimate channel bandwidth information. The estimated channel bandwidth information may be identified based on the channel bandwidth information included in the HEW-SIG-A/B 730 transmitted after the HEW-STF 710.

The HEW-LTF(s) 720 may be used for channel estimation for decoding the HEW-SIG-A/B 730 and/or Data field 740.

The number of HEW-LTF(s) 720 included in the HEW PPDU may be determined based on the number of space-time streams.

Figure 8:
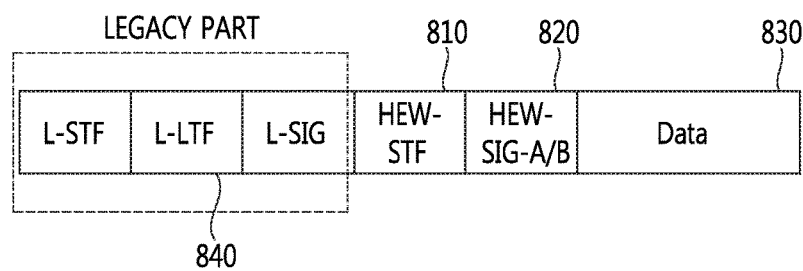
FIG. 8 is a schematic view illustrating an HEW PPDU according to one embodiment of the present invention.

FIG. 8 is a schematic view illustrating an HEW PPDU according to one embodiment of the present invention.

Referring to FIG. 8, an HEW part of the HEW PPDU may sequentially include an HEW-STF 810 and an HEW-SIG-AB 820.

The HEW PPDU may include no HEW-LTF. Instead of the HEW-LTF, the HEW-SIG-A/B 820 and a Data field 850 may each include a signal for channel prediction (for example, pilot signal) to perform channel prediction. The signal for channel prediction may be used not only for channel prediction but also for channel tracking and/or frequency tracking.

According to another embodiment of the present invention, when the HEW PPDU is sufficiently transmitted within a coherence time due to insignificant changes in an channel environment, an L-LTF 840 included in a legacy part may be used for decoding the HEW part. In detail, a channel prediction result predicted based on the L-LTF 840 may be used for decoding the HEW part.

Figure 9:
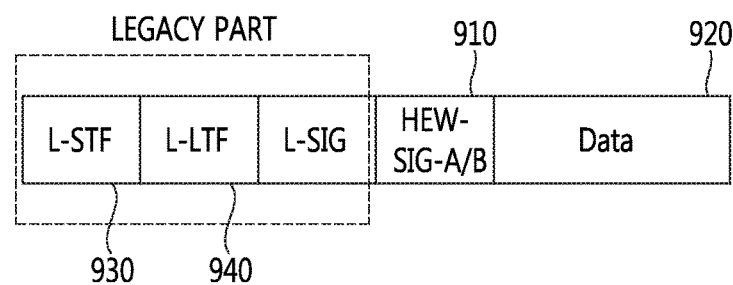
FIG. 9 is a schematic view illustrating an HEW PPDU according to one embodiment of the present invention.

FIG. 9 is a schematic view illustrating an HEW PPDU according to one embodiment of the present invention.

Referring to FIG. 9, an HEW part of the HEW PPDU may include an HEW-SIG-AB 910 only.

The HEW PPDU may include no HEW-STF. Thus, an L-STF 930 of a legacy part may be used for AGC of the HEW part. Specifically, when quantization level ranges of analog-to-digital converter (ADC) terminals are not significantly different in the legacy part and the HEW part, the HEW part includes no HEW-STF and the L-STF 930 may be used for AGC of the HEW part.

As described above in FIG. 8, the HEW PPDU may include no HEW-LTF. As described above, instead of the HEW-LTF, the HEW-SIG-A/B 910 and a Data field 920 may each include a signal for channel prediction (for example, pilot signal) to perform channel prediction. Alternatively, an L-LTF 940 included in the legacy part may be used for decoding the HEW part.

According to the embodiment of the present invention, a transmitting STA which transmits the HEW PPDU may periodically transmit an HEW PPDU including an HEW-STF and/or HEW-LTF.

The HEW-STF and HEW-LTF periodically transmitted through the HEW PPDU may be designed in a minimal structure intensively considering a synchronization function. Information on a transmission period of the HEW-STF and HEW-LTF is system information, which may be transmitted as included in a frame used for initial channel access (for example, at least one frame of a beacon frame, probe response frame and association response frame).

Figure 10:
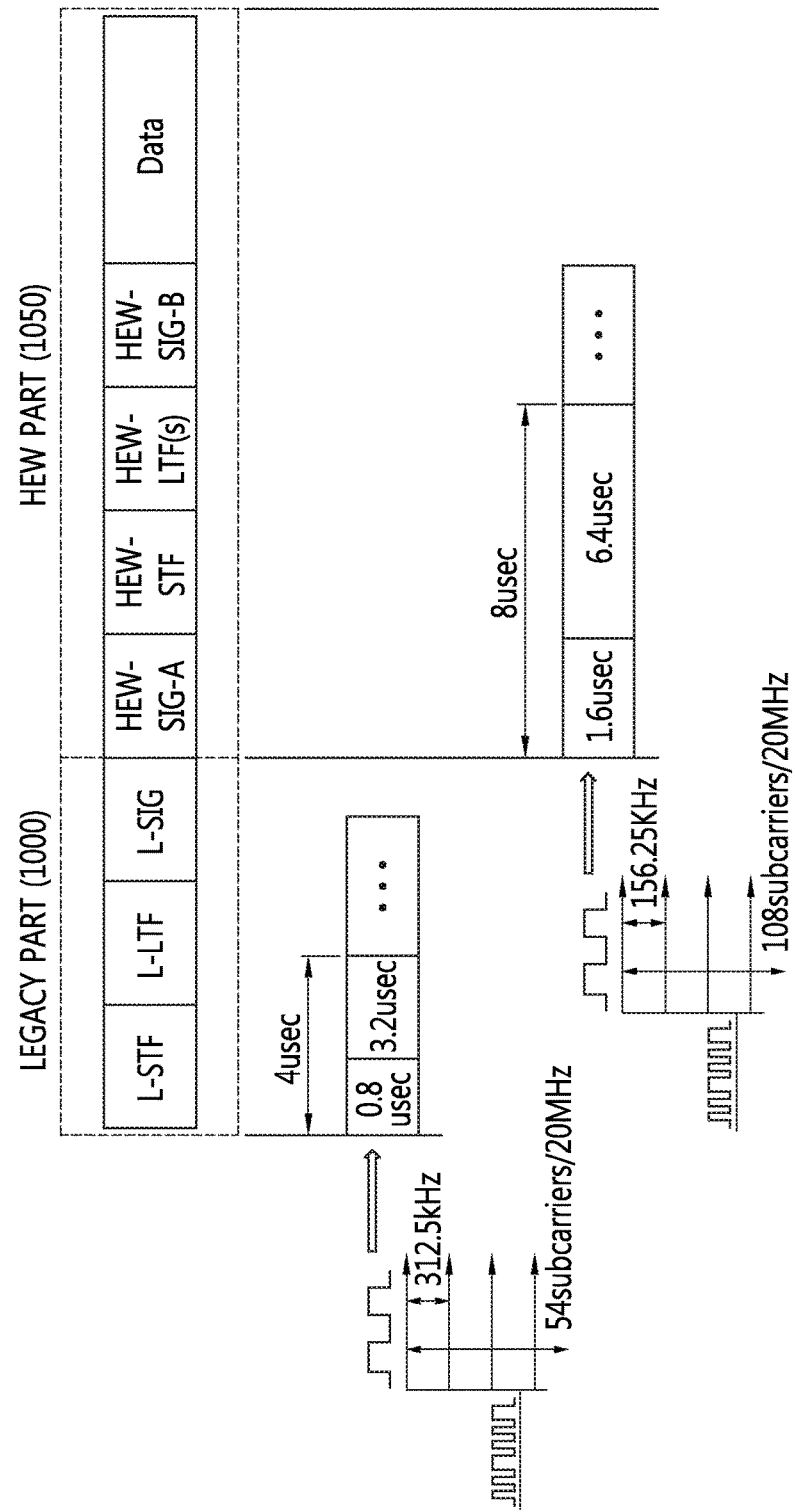
FIG. 10 is a schematic view illustrating a subcarrier for transmitting an HEW PPDU according to one embodiment of the present invention.

FIG. 10 is a schematic view illustrating a subcarrier for transmitting an HEW PPDU according to one embodiment of the present invention.

Referring to FIG. 10, a legacy part 1000 and an HEW part 1050 of the HEW PPDU may be generated based on different FFT sizes. FIG. 10 illustrates FFT size changes of the legacy part 1000 and the HEW part 1050 with reference to the HEW PPDU illustrated in FIG. 6. The HEW part 1050 is assumed to include a Data field.

In an outdoor WLAN communication environment, a delay spread may increase. To reduce effects of the increase in delay spread, an FFT with a different size from that for the legacy part 1000 may be applied to the HEW part.

Specifically, a 64-FFT may be applied to the legacy part 1000 in a 20 MHz channel bandwidth. 52 subcarriers based on the 64-FFT may be used to transmit data, among which 48 subcarriers may be used to transmit traffic data and four subcarriers to etransmit a pilot signal. An interval between subcarriers may be 312.5 kHz. Further, the size (or width) of an OFDM symbol may be a 4 usec, and the length of a GI (TGI) may be 0.8 usec. The size of an active (or useful, valid, available) OFDM symbol may be 3.2 usec, which is obtained by subtracting the TGI (0.8 usec) from the size of the OFDM symbol (4 usec).

According to the embodiment of the present invention, a 128-FFT may be applied to the HEW part 1050 in a 20 MHz channel bandwidth.

When the 128-FFT is used, 104 subcarriers based on the 128-FFT may be used for data transmission. When the 104 subcarriers are used, an interval between subcarriers may be 312.5/2 (=156.25) kHz. The interval between subcarriers may be the inverse number of the width of an active OFDM symbol obtained by subtracting a TGI from the size of an OFDM symbol. Thus, when the 104 subcarriers are used, the size of the active OFDM symbol may increase to 6.4 usec, which is twice as long as 3.2 usec and the TGI may also be increased to 1.6 usec, which is twice as long as 0.8 usec. That is, the length of the OFDM symbol may be increased from 4 usec to 8 usec. According to the embodiment of the present invention, the length of the TGI may be adjusted depending on communication environments. When the TGI has a length of 0.8 usec, the length of the active OFDM symbol is increased to 7.2 usec and data throughput per unit time (or unit symbol) may increase. Using an FFT with an increased size may increase the TGI and accordingly increase transmission coverage of the HEW PPDU.

Application of FFTs with different sizes may be described as follows in view of generation of a PPDU by an STA.

An STA may generate and transmit a PPDU including a first portion (legacy part or L-SIG) and a second portion (HEW part, HEW-SIC-A or HEW-SIG-A/B). The first portion may be generated by performing an inverse FFT (IFFT) based on a first FFT size, and the second portion may be generated by performing an IFFT based on a second FFT size. Here, the first FFT size may be different from the second FFT, and the second FFT size may be a multiple of 2 times as large as the first FFT size.

It may be assumed that the first portion is transmitted on a first OFDM symbol and the second portion is transmitted on a second OFDM symbol. In this case, the duration of the first OFDM symbol may be the sum of a first guard interval duration and a first FFT period determined on the first FFT size, and the duration of the second OFDM symbol may be the sum of a second guard interval duration and a second FFT period determined on the second FFT size. Here, the second guard interval duration may be longer than the first guard interval duration.

The 128-FFT is an example of an FFT with an increased size, and a 256-FFT and 512-FFT may also be used, which are included in an embodiment within the scope of the present invention. Using an FFT with an increased size may increase transmission coverage of the HEW PPDU.

When the FFT size for the legacy part 1000 and the HEW part 1050 are different as above, a problem may occur when the STA decodes a PPDU due to application of OFDM numerology to the legacy part 1000 and the HEW part 1050 in different manners.

An HEW STA needs to be able to decode both the legacy part 1000 and the HEW part 1050. Thus, the HEW STA needs to detect portions of the HEW PPDU subjected to FFTs with different sizes. Detecting portions of an HEW PPDU subjected to FFTs with different sizes may also be referred to as an OFDM numerology check.

When there are portions subjected to FFTs with different sizes (for example, a multiple of 2 times, for example, four times) in a received PPDU, the HEW STA may determine the received PPDU as an HEW PPDU. On the contrary, when there are portions subjected to FFTs with different sizes in a received PPDU after the legacy part (L-STF, L-LTF and L-SIG) 1000, a legacy STA may determine the received PPDU as an HEW PPDU and not perform additional decoding.

Hereinafter, one embodiment of the present invention discloses a method of an HEW STA detecting portions subjected to FFTs with different sizes in an HEW PPDU.

Figure 11:
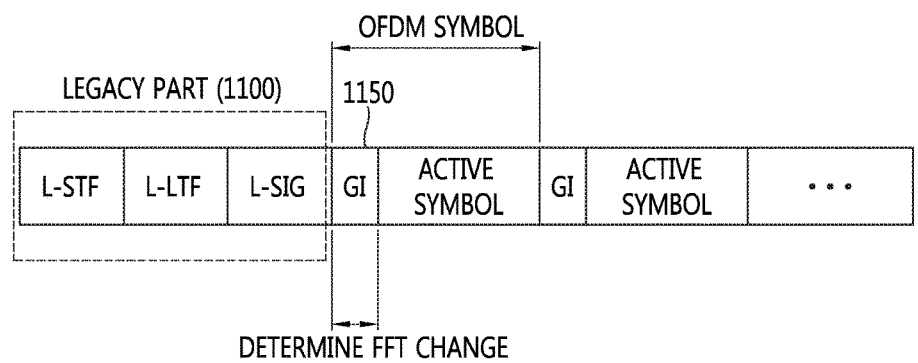
FIG. 11 is a schematic view illustrating a method of an HEW STA detecting an FFT size in an HEW PPDU according to one embodiment of the present invention.

FIG. 11 is a schematic view illustrating a method of an HEW STA detecting an FFT size in an HEW PPDU according to one embodiment of the present invention.

Referring to FIG. 11, an HEW STA may determine an FFT size applied to a guard interval period 1150 of an OFDM symbol allocated to a field (a temporally first field in an HEW part in an HEW PPDU) followed by a legacy part (L-STF, L-LTF and L-SIG) 1100 of a received PPDU. That is, the HEW STA may determine an FFT size used for a channel bandwidth given in the guard interval period 1150 of the OFDM symbol allocated to the field followed by the legacy part 1100. As a result of determination, when the FFT size is changed, the HEW STA may determine the received PPDU as an HEW PPDU.

The number of subcarriers on an OFDM symbol corresponding to the HEW part may be a multiple of 2 times (for example, twice, four times and the like) as large as the number of subcarriers on an OFDM symbol corresponding to the legacy part.

According to the embodiment of the present invention, to determine a change in FFT size by an STA, some OFDM symbols allocated for the HEW part in the HEW PPDU may include a GI with a sufficient length. For example, the GI for some OFDM symbols allocated for the HEW part may be a long GI, a double GI or a triple GI. For example, the double GI has a length twice as long as the short GI, and the triple GI has a length three times as long as the short GI.

Figure 12:
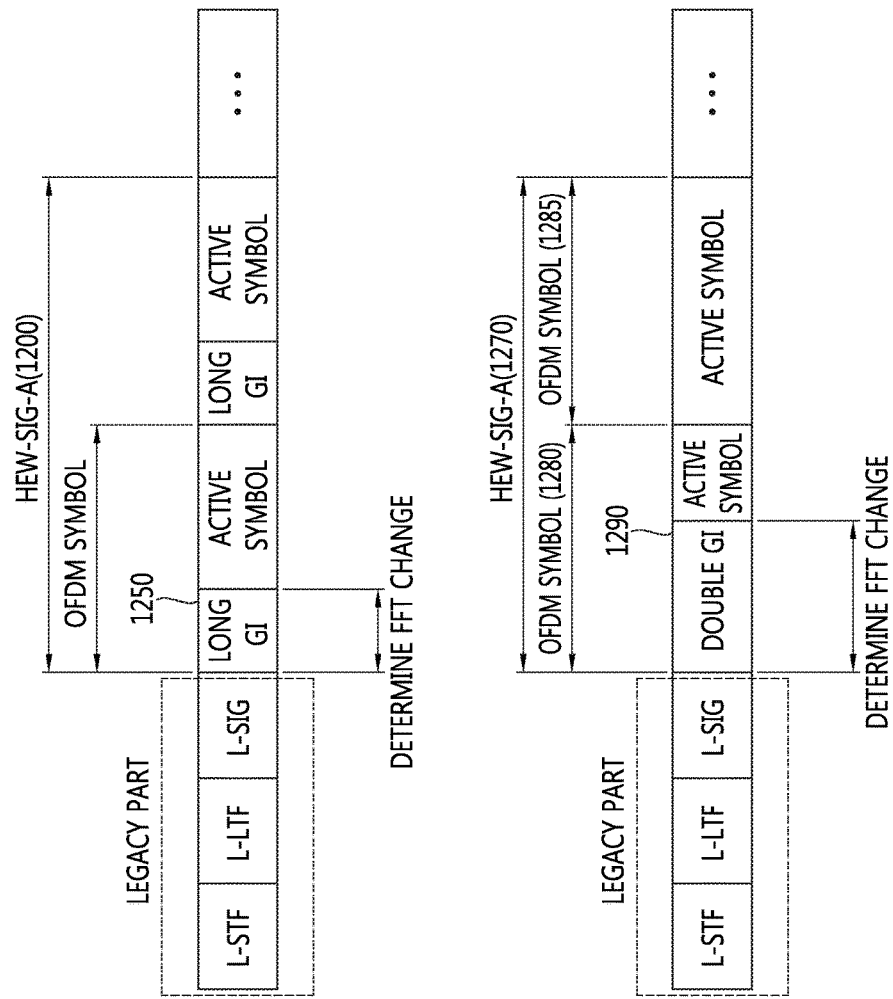
FIG. 12 is a schematic view illustrating a method of an HEW STA detecting an FFT size in an HEW PPDU according to one embodiment of the present invention.

FIG. 12 is a schematic view illustrating a method of an HEW STA detecting an FFT size in an HEW PPDU according to one embodiment of the present invention.

FIG. 12 discloses a configuration of a GI of an HEW part in the HEW PPDU.

In FIG. 12, it is assumed that as an illustrative example of an HEW PPDU, an HEW part of an HEW PPDU includes an HEW-SIG-A, HEW-STF, HEW-LTF, HEW-SIG-B and Data field as illustrated in FIG. 6. Further, it is assumed that the HEW-SIG-A is allocated two OFDM symbols.

In this case, the OFDM symbols for the HEW-SIG-A as a first field of the HEW part may include a long GI, double GI or triple GI.

As illustrated at the top of FIG. 12, when a plurality of OFDM symbols is allocated to the HEW-SIG-A 1200, a long GI 1250 may be included in each OFDM symbol corresponding to the HEW-SIG-A 1200.

Alternatively, as illustrated at the bottom of FIG. 12, to facilitate determination of an FFT size change by the HEW STA, a first OFDM symbol 1280 among the OFDM symbols allocated to the HEW-SIG-A 1270 may include a double GI 1290 or triple GI, and the other OFDM 1285 may include a relatively shorter GI or no GI.

Figure 13:
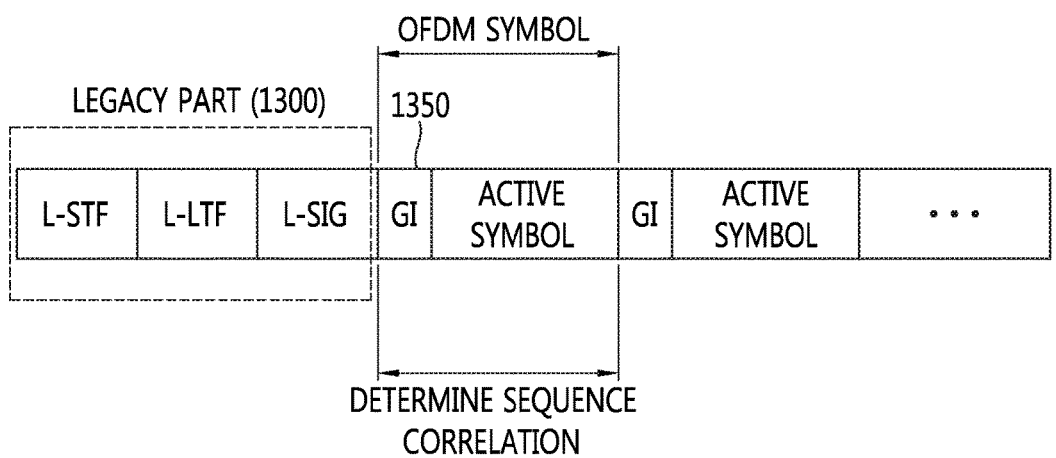
FIG. 13 is a schematic view illustrating a method of an HEW STA detecting an FFT size in an HEW PPDU according to one embodiment of the present invention.

FIG. 13 is a schematic view illustrating a method of an HEW STA detecting an FFT size in an HEW PPDU according to one embodiment of the present invention.

FIG. 13 discloses an FFT size detection method of the HEW STA when a training field, such as HEW-STF (or HEW-LTF), is located as a first field of an HEW part.

For example, the HEW STA may detect a sequence correlation of an OFDM symbol transmitted subsequent to a legacy part 1300 (hereinafter, "detection OFDM symbol 1350).

When the sequence correlation of the detection OFDM symbol 1350 is determined as a first correlation characteristic, the HEW STA may determine the FFT size as a first FFT size. When the sequence correlation of the detection OFDM symbol 1350 is determined as a second correlation characteristic, the HEW STA may determine the FFT size as a second FFT size. When the FFT size is determined as the second FFT size, the HEW STA may determine the OFDM symbol transmitted subsequent to the legacy part 1300 as an HEW-STF included in the HEW part.

As described above, when the HEW-STF precedes a signaling field (for example, HEW-SIG-A), the HEW STA may need to perform blind detection in an OFDM symbol corresponding to the HEW-STF in order to acquire channel bandwidth information. To solve such a problem, an HEW-STF sequence may be mapped onto channel bandwidth information, and the HEW STA may acquire the channel bandwidth information based on the HEW-STF sequence.

For example, when the HEW PPDU includes an HEW-STF, HEW-LTF, HEW-SIG-A/B and Data field, an HEW-STF sequence may include channel bandwidth information and the HEW-SIG may include no separate channel bandwidth information.

Figure 14:
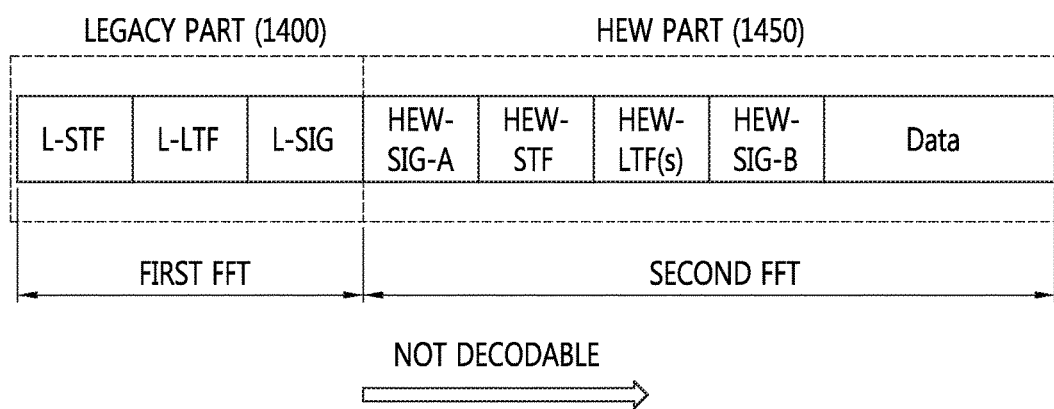
FIG. 14 is a schematic view illustrating an operation when a legacy STA receives an HEW PPDU according to one embodiment of the present invention.

FIG. 14 is a schematic view illustrating an operation when a legacy STA receives an HEW PPDU according to one embodiment of the present invention.

FIG. 14 is described with reference to the HEW PPDU illustrated in FIG. 6.

Referring to FIG. 14, the legacy STA detects a field followed by a legacy part 1400 (field followed by an L-SIG). When the field is a field not decodable (for example, a field generated based on a different FFT size), the legacy STA may configure a network allocation vector (NAV) based on a length field in the L-SIG without performing additional decoding and defer channel access.

That is, as different OFDM numerologies are applied to the legacy part 1400 and an HEW part 1450, the legacy STA may determine the HEW part 1450 as a field not decodable.

Alternatively, the legacy STA may determine constellation information on up to at least one OFDM symbol followed by the legacy part 1400 using auto-detection rules in order to determine whether a received PPDU is a decodable PPDU format. That is, the legacy STA may determine whether the received PPDU is a decodable PPDU format based on the constellation information on the at least one OFDM symbol followed by the legacy part.

Figure 15:
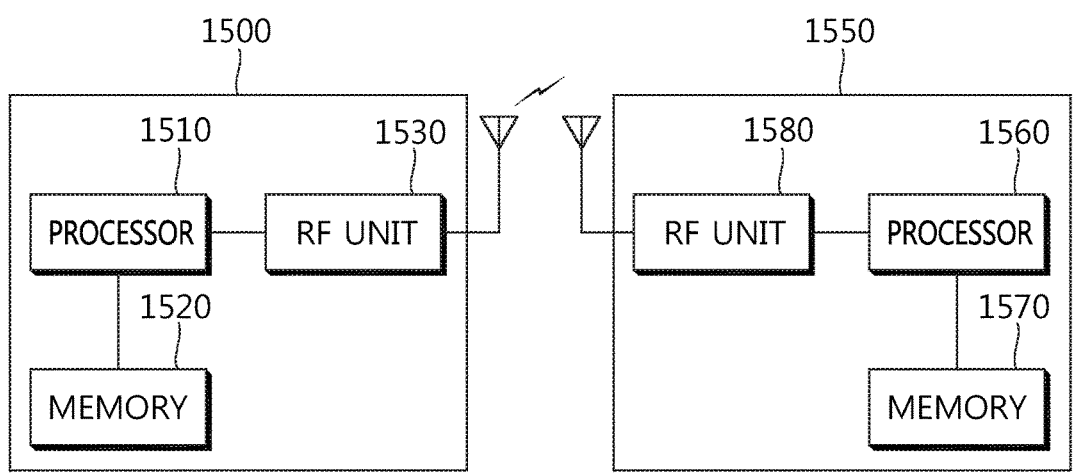
FIG. 15 is a block diagram illustrating a wireless device to which an embodiment of the present invention may apply.

FIG. 15 is a block diagram illustrating a wireless device to which an embodiment of the present invention may apply.

Referring to FIG. 15, the wireless device may be an STA that may implement the above-described embodiments, and the wireless device may be an AP 1500 or a non-AP STA (or STA)(1550).

The AP 1500 includes a processor 1510, a memory 1520, and an RF (Radio Frequency) unit 1530.

The RF unit 1530 may be connected with the processor 1510 to transmit/receive radio signals.

The processor 1510 implements functions, processes, and/or methods as proposed herein. For example, the processor 1510 may be implemented to perform the operation of the above-described wireless device according to an embodiment disclosed in FIG. 6 to FIG. 14 of the present invention.

For example, the processor 1510 may be configured to generate and transmit a PPDU including a first portion and a second portion. The first portion may be generated by performing an inverse FFT (IFFT) based on a first FFT size, and the second portion may be generated by performing an IFFT based on a second FFT size.

The STA 1550 includes a processor 1560, a memory 1570, and an RF (Radio Frequency) unit 1580.

The RF unit 1580 may be connected with the processor 1560 to transmit/receive radio signals.

The processor 1560 implements functions, processes, and/or methods as proposed herein. For example, the processor 1560 may be implemented to perform the operation of the above-described wireless device according to an embodiment disclosed in FIG. 6 to FIG. 14 of the present invention.

For example, the processor 1560 may be configured to determine an HEW part in a received PPDU based on a change in FFT size used in the received PPDU.

The processor 1510, 1560 may include an ASIC (Application-Specific Integrated Circuit), other chipset, a logic circuit, a data processing device, and/or a converter that performs conversion between a baseband signal and a radio signal. The memory 1520, 1570 may include a ROM (Read-Only Memory), a RAM (Random Access Memory), a flash memory, a memory card, a storage medium, and/or other storage device. The RF unit 1530, 1580 may include one or more antennas that transmit and/or receive radio signals.

When an embodiment is implemented in software, the above-described schemes may be embodied in modules (processes, or functions, etc.) performing the above-described functions. The modules may be stored in the memory 1520, 1570 and may be executed by the processor 1610, 1660. The memory 1520, 1570 may be positioned in or outside the processor 1610, 1660 and may be connected with the processor 1510, 1560 via various well-known means.

What is claimed is:

1. A method for transmitting a physical layer protocol data unit (PPDU), the method comprising:
constructing, by a station (STA), the PPDU including a first portion and a second portion, wherein the first portion includes a legacy short training field (L-STF), a legacy long training field (L-LTF), and a legacy signal (L-SIG), wherein the first portion is followed by the second portion in each PPDU and includes a high efficiency (HE) STF, a HE-LTF, and a data field, wherein the first portion is constructed by a first inverse Fourier transform operation based on a first subcarrier frequency spacing, wherein the second portion is constructed by a second inverse Fourier transform operation based on a second subcarrier frequency spacing, wherein the first subcarrier frequency spacing of the first portion is set to be greater than the second subcarrier frequency spacing of the second portion; and
transmitting, by the STA, the PPDU.

2. The method of claim 1, wherein the STA is an Access Point (AP) station or a non-AP station.

3. The method of claim 1, wherein the first inverse Fourier transform operation is performed based in a first inverse Fourier transform size, wherein the second inverse Fourier transform operation is performed based in a second inverse Fourier transform size.

4. The method of claim 3, wherein the second inverse Fourier transform size is larger than the first inverse Fourier transform size.

5. The method of claim 1, each field in the PPDU is transmitted based on a same frequency bandwidth.

6. A station (STA) transmitting a physical layer protocol data unit (PPDU), the STA comprising:
a transceiver transmitting a radio signal; and
a processor connected to the transceiver and configured to:
construct the PPDU including a first portion and a second portion, wherein the first portion includes a legacy short training field (L-STF), a legacy long training field (L-LTF), and a legacy signal (L-SIG), wherein the first portion is followed by the second portion in each PPDU and includes a high efficiency (HE) STF, a HE-LTF, and a data field, wherein the first portion is constructed by a first inverse Fourier transform operation based on a first subcarrier frequency spacing, wherein the second portion is constructed by a second inverse Fourier transform operation based on a second subcarrier frequency spacing, wherein the first subcarrier frequency spacing of the first portion is set to be greater than the second subcarrier frequency spacing of the second portion; and
control the transceiver to transmit the PPDU.

7. The STA of claim 6, wherein the STA is an Access Point (AP) station or a non-AP station.

8. The STA of claim 6, wherein the first inverse Fourier transform operation is performed based in a first inverse Fourier transform size, wherein the second inverse Fourier transform operation is performed based in a second inverse Fourier transform size.

9. The STA of claim 8, wherein the second inverse Fourier transform size is larger than the first inverse Fourier transform size.

10. The STA of claim 6, each field in the PPDU is transmitted based on a same frequency bandwidth.

* * * * *